(12) United States Patent
Gauchel et al.

(10) Patent No.: US 11,708,814 B2
(45) Date of Patent: Jul. 25, 2023

(54) METHOD FOR OPERATING A WIND TURBINE, A METHOD FOR DESIGNING A WIND TURBINE, AND A WIND TURBINE

(71) Applicant: General Electric Renovables España, S.L, Barcelona (ES)

(72) Inventors: Peter Gauchel, Salzbergen (DE); Jacob Johannes Nies, Salzbergen (DE)

(73) Assignee: General Electric Renovables Espana, S.L, Barcelona (ES)

( * ) Notice: Subject to any disclaimer, the term of this patent is extended or adjusted under 35 U.S.C. 154(b) by 1 day.

(21) Appl. No.: 17/463,984

(22) Filed: Sep. 1, 2021

(65) Prior Publication Data

US 2022/0065222 A1    Mar. 3, 2022

(30) Foreign Application Priority Data

Sep. 2, 2020 (EP) ..................... 20194166

(51) Int. Cl.
*F03D 7/02* (2006.01)
*F03D 9/25* (2016.01)
*F03D 15/00* (2016.01)

(52) U.S. Cl.
CPC ............. *F03D 7/0264* (2013.01); *F03D 9/25* (2016.05); *F03D 15/00* (2016.05); *F05D 2220/76* (2013.01)

(58) Field of Classification Search
CPC .......... F03D 7/0264; F03D 9/25; F03D 15/00; F03D 7/0224; F03D 7/0268; F03D 7/043; F05D 2220/76; F05B 2260/87; F05B 2270/1077; F05B 2270/3201; F05B 2270/326; F05B 2270/03
See application file for complete search history.

(56) References Cited

U.S. PATENT DOCUMENTS

| 6,870,281 | B2 * | 3/2005 | Weitkamp ............. F03D 7/0268 290/55 |
| 7,436,083 | B2 | 10/2008 | Shibata et al. |
| 7,445,420 | B2 * | 11/2008 | Yoshida ................ F03D 7/0224 415/908 |
| 8,360,723 | B2 | 1/2013 | Veldkamp et al. |

(Continued)

FOREIGN PATENT DOCUMENTS

| EP | 2072814 A2 * | 6/2009 | ........... F03D 7/0244 |
| WO | WO2010060772 A2 | 6/2010 | |

OTHER PUBLICATIONS

European Search Report Corresponding to EP20194166.3, dated Feb. 24, 2021.

*Primary Examiner* — J. Todd Newton

(74) *Attorney, Agent, or Firm* — Dority & Manning, P.A.

(57) ABSTRACT

A method (1000-1004) for operating a wind turbine (10, 11) including a drive train (64) including a generator (42) and a rotor shaft (44) mechanically connected with the generator (42) and having an axis (30) of rotation, and a rotor (18) having rotor blades (22-22c). The rotor (18) is mechanically connected with the rotor shaft (44) and rotatable about the axis (30) of rotation. The method (1000-1004) includes determining (1100) that the generator (42) is not operating in a power generating mode, and operating (1200) the rotor (18) to move around a predefined desired angular orientation ($\alpha_{des}$) with respect to the axis (30) of rotation in an alternating fashion.

13 Claims, 5 Drawing Sheets

(56) References Cited

U.S. PATENT DOCUMENTS

| | | |
|---|---|---|
| 8,360,724 B2 | 1/2013 | Yoshida |
| 8,362,632 B2 | 1/2013 | Nielsen et al. |
| 8,680,700 B2 | 3/2014 | De Las Heras Carbonell et al. |
| 2003/0075929 A1* | 4/2003 | Weitkamp ............. F03D 7/0268 290/55 |
| 2004/0105751 A1* | 6/2004 | Wobben ................ F03D 7/0212 415/4.1 |
| 2006/0099075 A1* | 5/2006 | Von Mutius .......... F03D 7/0296 416/131 |
| 2011/0076142 A1* | 3/2011 | Veldkamp ............ F03D 7/0224 416/31 |
| 2012/0027589 A1* | 2/2012 | Haag ...................... F03D 7/043 416/1 |
| 2012/0282093 A1* | 11/2012 | Rebsdorf ............. F03D 7/0268 416/1 |
| 2015/0252783 A1* | 9/2015 | Eusterbarkey ........ F03D 7/0268 415/2.1 |
| 2016/0377057 A1 | 12/2016 | Caponetti et al. |
| 2018/0347542 A1* | 12/2018 | Tomas .................... F03D 17/00 |

* cited by examiner

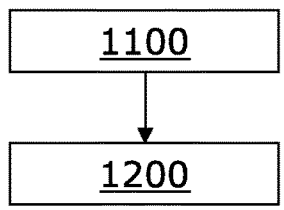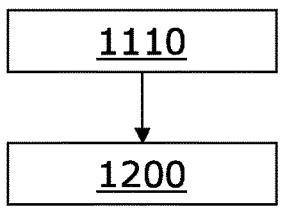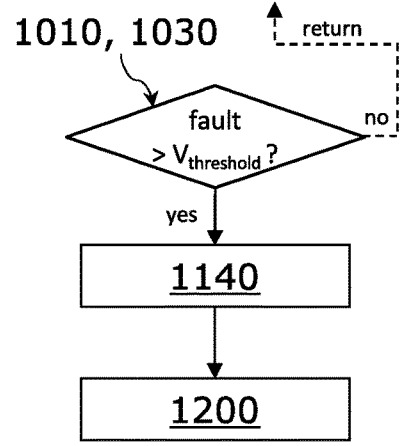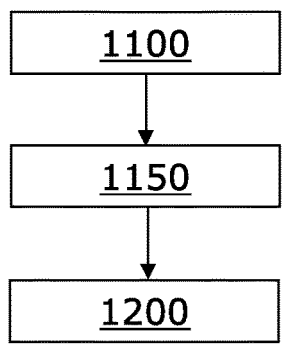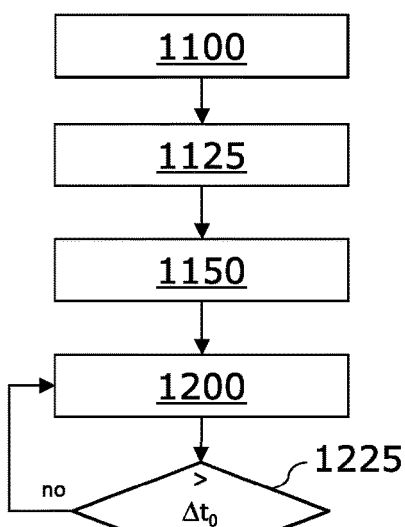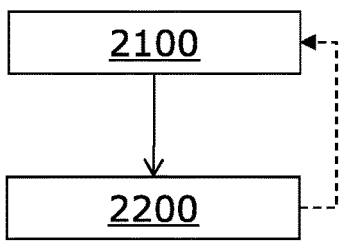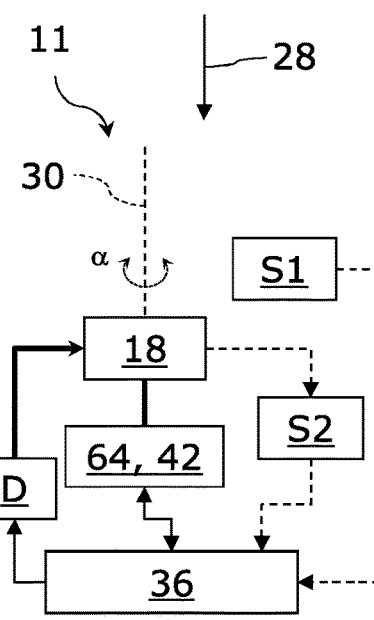

METHOD FOR OPERATING A WIND TURBINE, A METHOD FOR DESIGNING A WIND TURBINE, AND A WIND TURBINE

FIELD

The present subject matter relates generally to operating wind turbines, and more particularly to operating wind turbines in high winds, to related wind turbines, and a method for designing wind turbines.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

In case of high wind speeds exceeding the cut-out speed of a wind turbine, in particular under storm conditions, the wind turbine's rotor is usually idling with the rotor blades positioned at fixed angular positions with respect to their respective pitch axis (pitch position), in particular in the respective so-called feather position (90° or close to 90°) to limit wind loads that otherwise could exceed a safety margin. For example, the rotor blades of an exemplary rotor with three rotor blades may be at the same pitch position, for example at 89°, or in a so-called staggered position, in which the first blade is at 89°, the second blade is 79° and third rotor blade is at 109°. Due to the idling mode, the rotor blades can be at any angular position with respect to the rotor axis of the rotor (azimuth position).

Nevertheless, loads may vary and become comparatively high during idling, respectively, in particular during a prolonged storm. This can create a challenge and imposes high demands on the load capacity of the wind turbine to be considered in the design phase of the wind turbine.

Accordingly, the present disclosure provides a method for operating a wind turbine according to claim 1, a method for designing a wind turbine according to claim 10, and a wind turbine according to claim 12.

BRIEF DESCRIPTION

Aspects and advantages of the invention will be set forth in part in the following description, or may be obvious from the description, or may be learned through practice of the invention.

In one aspect, the present disclosure is directed to a method for operating a wind turbine. The wind turbine includes a rotor having rotor blades, and a drive train including a generator and a rotor shaft mechanically connected with the generator and having an axis of rotation. The rotor is mechanically connected with the rotor shaft and rotatable about the axis of rotation. The method includes determining that the generator is not operating in a power generating mode, and operating the rotor to move around a predefined desired angular orientation with respect to the axis of rotation in an alternating fashion.

Accordingly, idling of the rotor and the disadvantages accompanied therewith such as high mechanical loads can be avoided, in particular in high wind conditions, i.e. when the wind speed is higher than allowing for converting wind energy into electrical power using the generator.

Instead the rotor may be controlled to move around a predefined desired angular orientation in which the loads are expected to act on wind turbine components are lower than a maximum value as function of the angular orientation, more typically at least close to a minimum value, when the generator is not in the power generating mode. The terms "power generating mode" and "non-power generating mode" of a generator as used within this specification intend to describe that the generator is used for converting mechanical energy (of then rotor) to electrical energy (power generating mode) and not used for converting mechanical energy (of then rotor) to electrical energy (non-power generating mode), respectively.

Accordingly, mechanical loads acting on the wind turbine components may be reduced at high wind speed in the non-power generating mode. Thus, life time, and/or maintenance intervals may be extended. As a consequence, even the (annual/total) power yield of the wind turbine may be increased without increasing costs.

Further, it may even be possible to operate the generator at higher wind speed in power generating mode (increased cut-out wind speed).

Alternatively or in addition, the corresponding reduced expected loads may be taken into account during a design phase of wind turbines.

Accordingly, one or several components of the wind turbine or even the complete wind turbine can be designed to be lighter and/or more cost-effective.

The loads can be expressed in terms of forces and/or moments acting on various locations in the turbine, in particular on structural or supporting components of the wind turbine, such as the nacelle and the tower, which are in the following also referred to as supporting structure.

The predefined desired angular orientation may be chosen with respect to a predefined measure for the mechanical loads.

The predefined measure typically depends on the particular type and/or design of a wind turbine and may correspond to a weighted measure, e.g. a weighted sum of the forces and/or moments acting at one or more locations of the wind turbine, in particular locations at the drive train and at supporting structure(s) including bearings of the wind turbine such as the tower and the nacelle.

Further, the forces and/or moments may be determined for varying wind speeds and/or varying wind directions and/or may represent respective maximum or averaged values.

Typically, the rotor is operated in a predefined angle range including the predefined desired angular orientation.

Accordingly, lubricating of components, in particular bearings is facilitated. Consequently, damaging resulting from insufficient lubricating and/or longer still stand such as false brinelling can be avoided.

The predefined angle range may be symmetric with respect to the predefined desired angular orientation and/or may, for a rotor with three rotor blades, be a most 45°, more typically at most 25°, and even more typically a least 20° or even 10° wide.

Operating the rotor to move around the predefined desired angular orientation and within the predefined angle range, respectively, in an alternating fashion typically includes reversing a direction of movement at least once, more typically at least two or at least three times.

Moving the rotor around the predefined desired angular orientation and within the predefined angle range, respectively, is may be but is typically not a periodic movement, e.g. due to the fluctuating wind.

For example, operating the rotor in the alternating fashion may include operating the rotor to move around the predefined desired angular orientation and within the predefined angle range, respectively, in an oscillating fashion, typically in a non-periodic oscillating fashion.

Determining that the generator is not operating in a power generating mode may include stopping an electric power generation of the generator and/or determining that the rotor is idling.

The electric power generation of the generator may be stopped after determining a fault condition, in particular a fault condition limiting or even preventing power conversion by the generator. The fault condition may be a fault condition of the wind turbine (internal fault condition), a fault condition referring to a windfarm the wind turbine belongs to, or a fault condition of a grid (grid fault) the wind turbine and the windfarm, respectively, is connected to.

The method for operating the wind turbine typically includes determining that a speed of the wind in front of and/or acting on the rotor is equal to or larger than a predefined threshold value prior to operating the rotor to move around the predefined desired angular orientation and within the predefined angle range, respectively.

This may include measuring the wind speed with an anemometer, a LIDAR or the like of the wind turbine or the windfarm respectively.

Further, an actual angular orientation of the rotor with respect to the axis of rotation may be determined, in particular after determining that the rotor is idling, after determining the fault condition, after stopping the electric power generation and/or when the speed of a wind is equal to or larger than the predefined threshold value.

If the actual angular orientation of the rotor is not close to the predefined desired angular orientation and not within the predefined angle range, respectively, the rotor may be transferred towards the predefined desired angular orientation.

In one embodiment, the threshold value is equal to or larger than a cut-out wind speed of the wind turbine.

In a further embodiment, the threshold value is smaller than the cut-out wind speed of the wind turbine. In this embodiment, the rotor is typically only transferred towards the predefined desired angular orientation and/or moved around the predefined desired angular orientation and within the predefined angle range, respectively, after determining a fault condition as explained above.

Further, the control may be based on two different threshold values for the wind speed, a first one lower than the cut-out wind speed of the wind turbine, and a second one corresponding to the cut-out wind speed or being somewhat higher, e.g. up to 5% 10% or even 15% higher than the cut-out wind speed.

The method for operating the wind turbine may further include determining a duration of operating the rotor to move around the predefined desired angular orientation and within the predefined angle range, respectively.

Further, on or after detecting that the determined duration is equal to or larger than a predefined time interval of e.g. a few seconds, a few ten seconds or even up to several minutes, the rotor may be transferred towards a further predefined desired angular orientation with respect to the axis of rotation.

Thereafter, the rotor may be operated to move around the further predefined desired angular orientation and within a further predefined angle range, respectively, in an alternating fashion.

Accordingly, the loads acting on the wind turbine may be more evenly distributed. Further, this may facilitate lubricating of bearings and the like even further.

Typically, the further predefined desired angular orientation is, due to a symmetry of the rotor, equivalent to the predefined desired angular orientation.

Likewise, the further predefined angle range may correspond to the predefined angle range but shifted.

For example, the further predefined desired angular orientation may deviate from the predefined desired angular orientation by +/−120° in embodiments referring to operating wind turbines having a three-blade rotor.

In these embodiments, the further predefined angle range may correspond to the predefined angle range shifted by +/−120°.

Transferring the rotor towards the predefined desired angular orientation, operating the rotor to move around the predefined desired angular and/or within the predefined desired angular orientation, transferring the rotor towards the further predefined desired angular orientation, and/or operating the rotor to move around the further predefined desired angular orientation and/or within the further predefined desired angular orientation may include and/or be achieved by pitching one of the rotor blades.

Typically, not all of the rotor blades are pitched during pitching the rotor blades, at least not simultaneously.

For example, only one of the rotor blades may be pitched a time to achieve the desired rotor movement.

Accordingly, energy consumption during this mode of operation may be reduced. This may be of particular importance, if an internal energy storage, in the following also referred to as (internal) power source, such as a battery of the wind turbine has to be used for energy supply, e.g. due to a grid fault.

Further, the rotor blade pitched at a time may change after a given time interval.

During pitching, a pitch angle range of the rotor blade(s) is typically also limited to a predefined range, for example to the feather position+/−20° or +/−15°.

Accordingly, the energy consumption may be further reduced.

Alternatively or in addition, a parking brake of the wind turbine or even the generator may be used to achieve the desired respective movement of the rotor.

For example, the generator rotor may be allowed to accelerate and decelerate within in certain limits to influence the rotor movement.

Further, the parking brake may be used to decelerate the rotor if desired.

In another aspect, the present disclosure is directed to a method for designing a wind turbine including a supporting structure, a drive train supported by the supporting structure, and a rotor having rotor blades. The drive train includes a generator and a rotor shaft mechanically connected with the generator and having an axis of rotation. The rotor is mechanically connected with the rotor shaft and rotatable about the axis of rotation. The method includes determining, for a given configuration of the wind turbine and assuming that the generator is not operating in a power generating mode while a wind acts on the rotor in a direction which is at least on average at least substantially parallel to the axis of rotation, a desired angular orientation so that a predefined measure for mechanical loads acting on the drive train and/or the supporting structure is expected to be lower when the rotor is at the desired angular orientation compared to another angular orientation of the rotor with respect to the axis of rotation, typically at least close to a minimum, more typically at least close to a global minimum.

The term "configuration of a wind turbine" as used herein intends to embrace the terms "model of the wind turbine", "design of the wind turbine" and "layout of the wind turbine". For example, the configuration of the wind turbine may include a model describing the mechanical properties of the wind turbine, in particular of the rotor (including the blades), the drive train, the generator and/or supporting structures, including their respective response under mechanical load.

The method for designing the wind turbine typically includes using the measure for the mechanical loads and/or the mechanical loads to determine desired material properties and/or desired geometric properties of the configuration so that the wind turbine is expected to safely withstand the wind when the rotor is operated at least close to desired angular orientation, e.g. moved around the predefined desired angular orientation in an alternating fashion and within an additionally determined (predefined) angle range, even if a speed of the wind reaches an expected maximum value and/or is fluctuating.

Determining the desired angular orientation of the rotor and/or using the measure for the mechanical loads and/or the mechanical loads may include one or more of the following steps:

determining the mechanical load for a plurality of rotor orientations, at varying wind speed, and/or at varying wind direction;

determining the mechanical loads at a multitude of positions within the wind turbine structure, at the drive train and/or the supporting structure;

determining a statistical property of the mechanical loads (N, F); and performing a respective numerical simulation.

Typically, the methods as explained herein are performed for a wind turbine with a rotor having three rotor blades.

For example, determining the desired angular orientation typically includes calculating the predefined measure for the mechanical loads for a plurality of rotor orientations which are at least close to a Y-position of a rotor with three rotor blades, e.g. calculating the predefined measure for the mechanical loads in an angle range of +/−25° or even +/−25° around the Y-position.

In another aspect, the present disclosure is directed to a wind turbine. The wind turbine includes a drive train including a generator and a rotor shaft having an axis of rotation and being mechanically connected with the generator. The wind turbine further includes a rotor including rotor blades, being mechanically connected with the rotor shaft and rotatable about the axis of rotation, at least one device for influencing a rotational movement of the rotor about the axis of rotation, and a controller connected with the generator and the at least one device for influencing the rotational movement of the rotor. The controller is configured to set the generator into a non-power generating mode and to control the at least one device such that the rotor moves around a predefined desired angular orientation with respect to the axis of rotation in an alternating fashion.

The term "device for influencing a rotational movement of the rotor" shall describe a device that is configured to exert and/or change a torque acting on the rotor, in particular a torque in direction of the axis of rotation.

Typically, the controller is configured to control the at least one device such that the rotor moves within a predefined angle range including the predefined desired angular orientation.

The controller may be configured to control the rotor movement around the desired angular orientation when a speed of the wind in front of and/or acting on the rotor is equal to or larger than a predefined threshold value.

For this purpose, the wind turbine may include a first sensor which is connected with the controller for measuring a value correlated with a speed of the wind in front of and/or acting on the rotor.

The wind turbine may further include a second sensor which is connected with the controller for measuring an actual angular orientation of the rotor with respect to the axis of rotation, for example a sensor for measuring an orientation of the rotor shaft.

Accordingly, the controlling the rotational movement of the rotor about the axis of rotation may be facilitated, for example performed as a close-loop control.

Typically, the wind turbine includes a pitch drive system coupled to the rotor blade(s) and controllable by the controller to provide a respective device for influencing the rotational movement of the rotor.

Alternatively or in addition, the wind turbine may include a rotor brake which is controllable by the controller to provide a respective device for influencing the rotational movement of the rotor.

Furthermore, the generator may be controllable by the controller to provide a respective device for influencing the rotational movement of the rotor.

Even further, the wind turbine may include a power source connected with the at least one device for power supply, in particular during an electrical power loss event of the wind turbine.

Alternatively or in addition, the at least one device may be supplied with electric power by a power backup provided by the wind farm.

Typically, the controller is configured to perform any of the processes of the methods for operating a wind turbine as explained herein.

In embodiments referring to wind turbines with a three-bladed rotor, the desired angular orientation may correspond to a Y-position of the rotor, but may also close to, but differ from the Y-position of the rotor, for example by up to several degrees or even up to about 20°.

The wind turbine may be an onshore wind turbine or an offshore wind turbine.

Other embodiments include corresponding computer-readable storage media or storage devices, and computer programs recorded on one or more computer-readable storage media or storage devices, respectively, configured to perform the processes of the methods described herein.

In particular, a computer program product and/or a computer-readable storage medium may include instructions which, when executed by a one or more processors of a system, such as a controller of a wind turbine, cause the system to carry out the processes of the methods explained herein.

The system of and/or including one or more computers and/or processors can be configured to perform particular operations or processes by virtue of software, firmware, hardware, or any combination thereof.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which refers to the appended figures, in which:

FIG. 5A illustrates a flow diagram of a method for operating a wind turbine according to an embodiment of the present disclosure;

FIG. 5B illustrates a flow diagram of a method for operating a wind turbine according to an embodiment of the present disclosure;

FIG. 5C illustrates a flow diagram of a method for operating a wind turbine according to an embodiment of the present disclosure;

FIG. 5D illustrates a flow diagram of a method for operating a wind turbine according to an embodiment of the present disclosure;

FIG. 5E illustrates a flow diagram of a method for operating a wind turbine according to an embodiment of the present disclosure;

FIG. 5F illustrates a flow diagram of a method for designing a wind turbine according to an embodiment of the present disclosure; and FIG. 5G illustrates a schematic view of a wind turbine according to an embodiment of the present disclosure.

Single features depicted in the figures are shown relatively with regards to each other and therefore are not necessarily to scale. Similar or same elements in the figures, even if displayed in different embodiments, are represented with the same reference numbers.

DETAILED DESCRIPTION OF THE INVENTION

Figure 1:
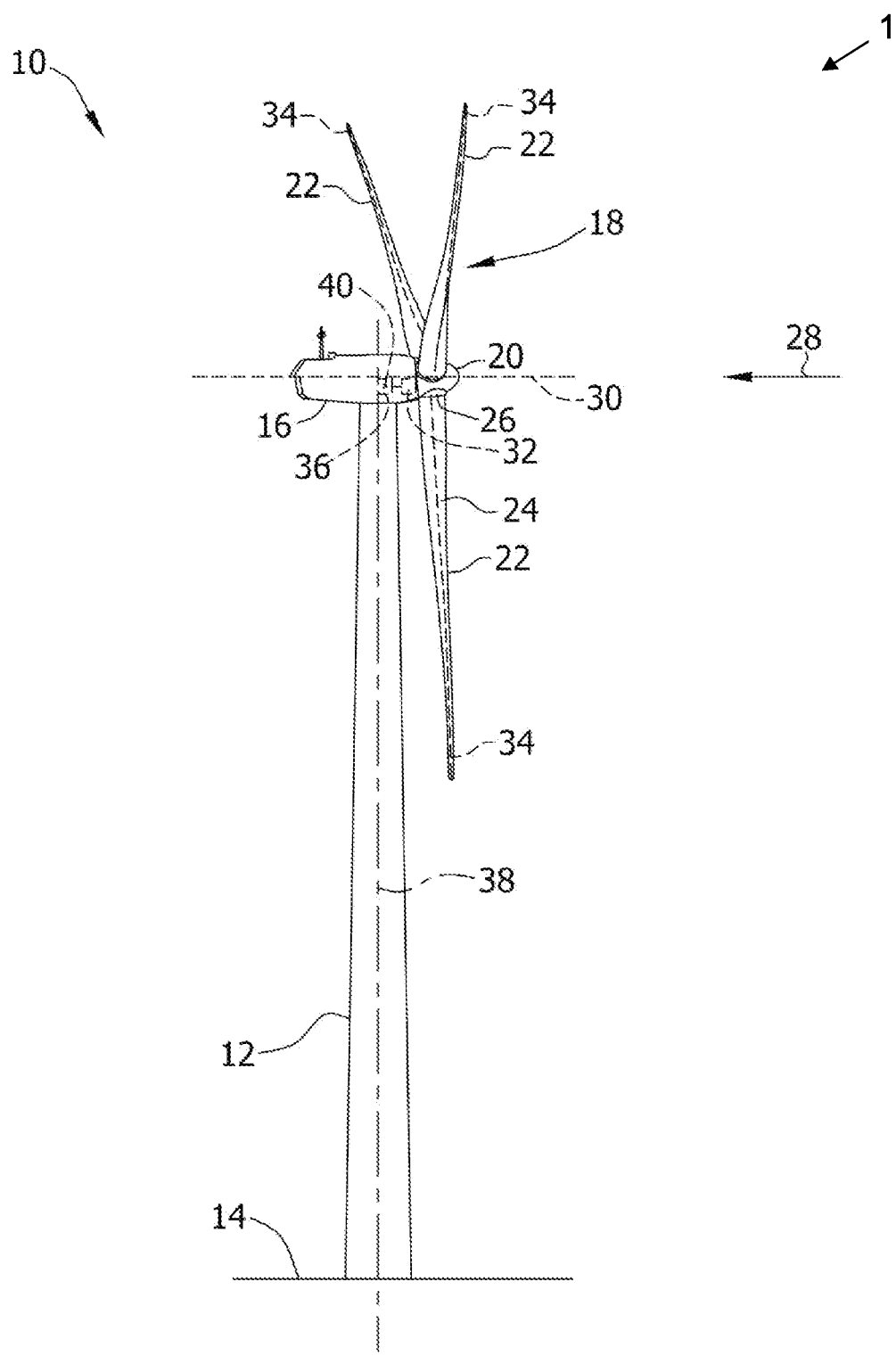
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an exemplary wind turbine 10. In the exemplary embodiment, the wind turbine 10 is a horizontal-axis wind turbine. In the exemplary embodiment, the wind turbine 10 includes a tower 12 that extends from a support system 14, a nacelle 16 mounted on tower 12, and a rotor 18 that is coupled to nacelle 16. The rotor 18 includes a rotatable hub 20 and at least one rotor blade 22 coupled to and extending outward from the hub 20. In the exemplary embodiment, the rotor 18 has three rotor blades 22. In an alternative embodiment, the rotor 18 includes more or less than three rotor blades 22. In the exemplary embodiment, the tower 12 is fabricated from tubular steel to define a cavity (not shown in FIG. 1) between a support system 14 and the nacelle 16. In an alternative embodiment, the tower 12 is any suitable type of a tower having any suitable height.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In one embodiment, the rotor blades 22 have a length ranging from about 15 meters (m) to about 91 m. Alternatively, rotor blades 22 may have any suitable length that enables the wind turbine 10 to function as described herein. For example, other non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about an axis of rotation 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines a perspective of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may change a pitch angle of the rotor blades 22 such that the rotor blades 22 are moved to a feathered position, such that the perspective of at least one rotor blade 22 relative to wind vectors provides a minimal surface area of the rotor blade 22 to be oriented towards the wind vectors, which facilitates reducing a rotational speed and/or facilitates a stall of the rotor 18.

In the exemplary embodiment, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the exemplary embodiment, as the wind direction 28 changes, a yaw direction of the nacelle 16 may be rotated about a yaw axis 38 to position the rotor blades 22 with respect to wind direction 28.

In the exemplary embodiment, the wind turbine controller 36 is shown as being centralized within the nacelle 16, however, the wind turbine controller 36 may be a distributed system throughout the wind turbine 10, on the support system 14, within a wind farm, and/or at a remote control center. The wind turbine controller 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

Figure 2:
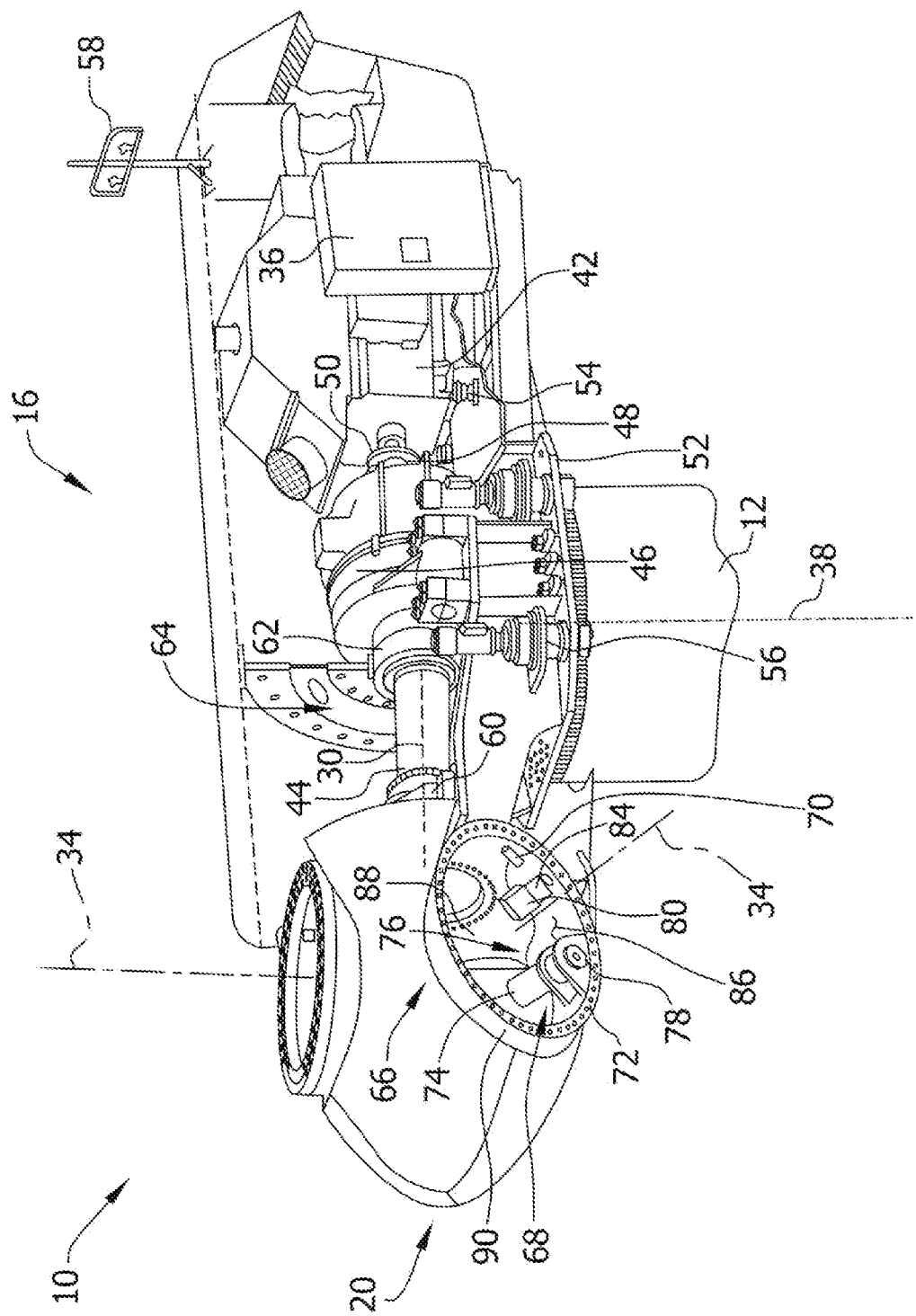
FIG. 2 illustrates a simplified, internal view of one embodiment of a nacelle of a wind turbine according to the present disclosure, particularly illustrating the nacelle during normal operation.

FIG. 2 is an enlarged sectional view of a portion of the wind turbine 10. In the exemplary embodiment, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high speed shaft 48, and a coupling 50. In the exemplary embodiment, the main shaft 44 is disposed at least partially coaxial to a longitudinal axis (not shown) of the nacelle 16. A rotation of the main shaft 44 drives the gearbox 46 that subsequently drives the high speed shaft 48 by translating the relatively slow rotational movement of the rotor 18 and of the main shaft 44 into a relatively fast rotational movement of the high speed shaft 48. The latter is connected to the generator 42 for generating electrical energy with the help of a coupling 50.

The gearbox 46 and generator 42 may be supported by a main support structure frame of the nacelle 16, optionally embodied as a main frame 52. The gearbox 45 may include a gearbox housing 102 that is connected to the main frame 52 by one or more torque arms 103. In the exemplary embodiment, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Preferably, the main frame 52 is configured to carry the entire load caused by the weight of the rotor 18 and components of the nacelle 16 and by the wind and rotational loads, and furthermore, to introduce these loads into the tower 12 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

The gearbox 46 may be accompanied by a gearbox system which also may comprise a reservoir for lubricant for lubricating gears and rotation bearings of the gearbox 46, lubricant duct arrangements, a lubricant pump a filter device and/or a cooling device for the lubricant.

However, the present disclosure is not limited to a wind turbine comprising a gearbox, but also wind turbines without a gearbox, thus, heading a so-called direct drive may be concerned as well.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle appropriately with respect to the wind direction 28, the nacelle 16 may also include at least one meteorological mast 58 that may include a wind vane and (neither shown in FIG. 2). The mast 58 provides information to the wind turbine controller 36 that may include wind direction and/or wind speed.

In the exemplary embodiment, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the exemplary embodiment, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is typically coupled to the wind turbine controller 36 for adjusting the pitch angle of a rotor blade 22 upon receipt of one or more signals from the wind turbine controller 36. In the exemplary embodiment, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servo-mechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 also includes one or more pitch control systems 80 for controlling the pitch drive system 68 according to control signals from the wind turbine controller 36, in case of specific prioritized situations and/or during rotor 18 overspeed. In the exemplary embodiment, the pitch assembly 66 includes at least one pitch control system 80 communicatively coupled to a respective pitch drive system 68 for controlling pitch drive system 68 independently from the wind turbine controller 36. In the exemplary embodiment, the pitch control system 80 is coupled to the pitch drive system 68 and to a sensor 70. During normal operation of the wind turbine 10, the wind turbine controller 36 controls the pitch drive system 68 to adjust a pitch angle of rotor blades 22.

In one embodiment, in particular when the rotor 18 operates at rotor overspeed, the pitch control system 80 overrides the wind turbine controller 36, such that the wind turbine controller 36 no longer controls the pitch control system 80 and the pitch drive system 68. Thus, the pitch control system 80 may be able to make the pitch drive system 68 to move the rotor blade 22 to a feathered position for reducing a rotational speed of the rotor 18.

According to an embodiment, an internal power source 84, for example comprising an electrical energy storage, in particular a battery and/or electric capacitors, is arranged at or within the hub 20 and is coupled to the sensor 70, the pitch control system 80, to the pitch drive system 68 and the yaw drive mechanism 56 to provide a source of power to these components. The internal power source 84 may also be a distributed power source. In particular, internal power source 84 may include an internal power source for the pitch assembly 66 and an internal power source for the yaw drive mechanism 56.

In the exemplary embodiment, the power source 84 provides a continuing source of power at least to the pitch assembly 66 during operation of the wind turbine 10. In an alternative embodiment, power source 84 provides power to at least to the pitch assembly 66 only during an electrical power loss event of the wind turbine 10. In this embodiment, the electrical power is also referred to as backup power source and emergency power supply, respectively. The electrical power loss event may include power grid loss or dip, malfunctioning of an electrical system of the wind turbine 10, and/or failure of the wind turbine controller 36. During the electrical power loss event, the power source 84 operates to provide electrical power to the pitch assembly 66 such that pitch assembly 66 can operate during the electrical power loss event. However, the power source 84 and backup power source 84, respectively, may also provide electrical power the other components, in particular the yaw drive mechanism 56. In this regard it should be noted that the wind turbine controller 36 is typically provided with a separate backup power source, for example an uninterruptible power supply (UPS).

In the exemplary embodiment, the pitch drive system 68, the sensor 70, the pitch control system 80, cables, and the power source 84 are each positioned in a cavity 86 defined by an inner surface 88 of hub 20. In an alternative embodiment, said components are positioned with respect to an outer surface 90 of hub 20 and may be coupled, directly or indirectly, to outer surface 90.

Furthermore, power source 84 may be electrically connected with or even be provided by an external power supply different to the grid, in particular by an emergency power network of the wind farm the wind turbine 10 belongs to, and/or a wind farm power source typically comprising a diesel aggregate, battery(ies) and/or electric capacitor(s).

Figure 3A:
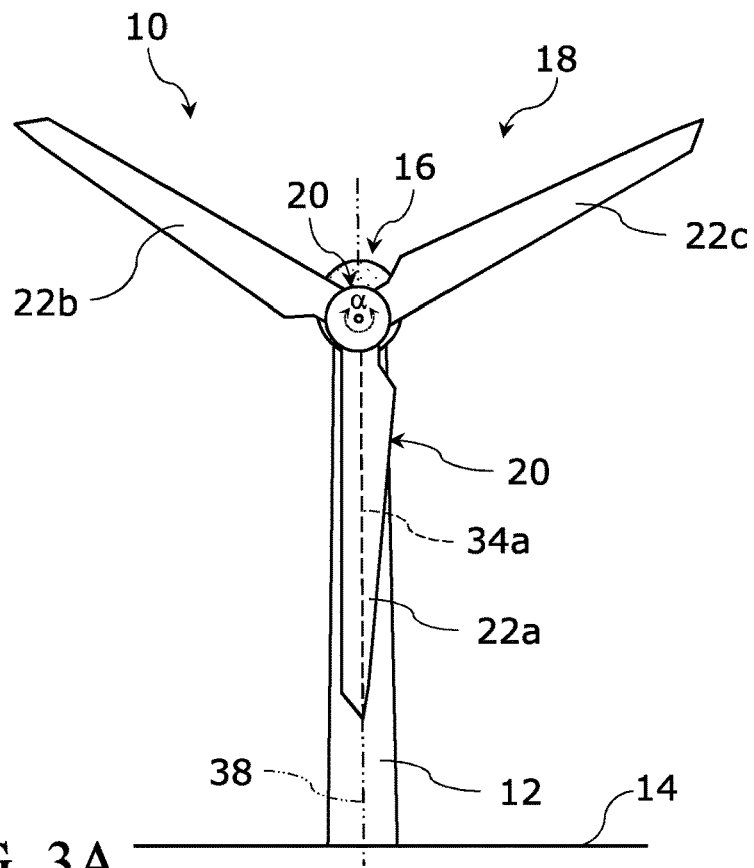
FIG. 3A and FIG. 3B illustrates front views of one embodiment of a wind turbine according to the present disclosure.
Figure 3B:
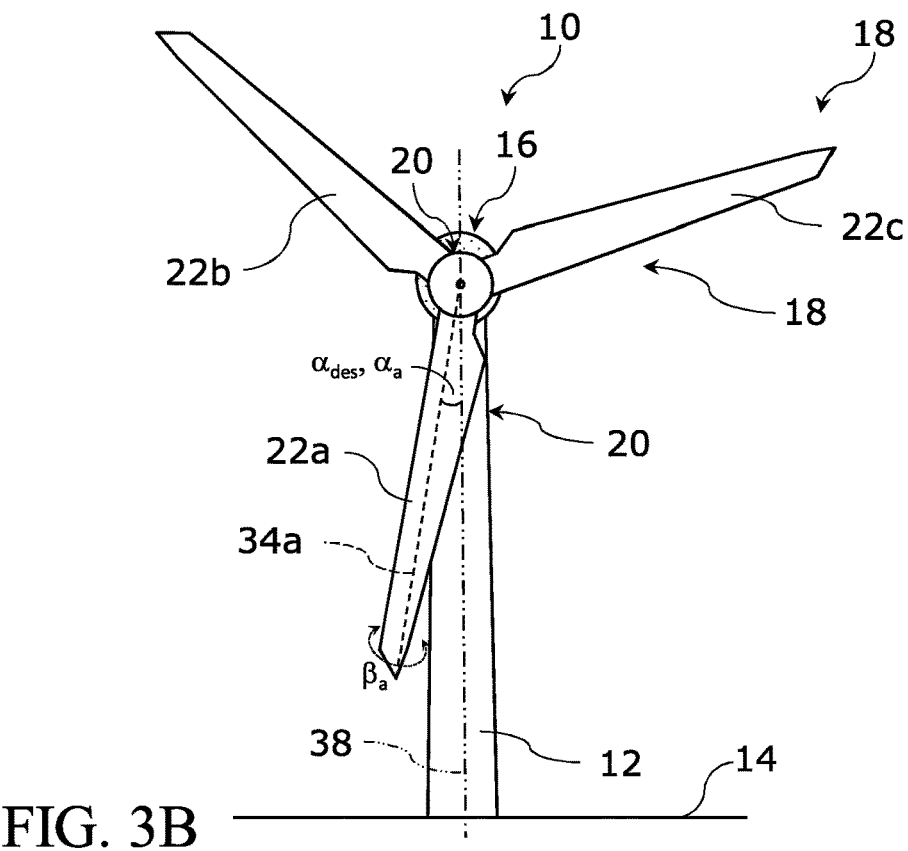

FIG. 3A and FIG. 3B are front views of wind turbine 10 corresponding to two different angular orientation α of rotor 18 with respect to the rotational axis 30 shown in FIG. 1. In the following the rotational axis 30 is also referred to as rotor axis.

In the exemplary embodiment, the angular orientation a of rotor 18 is measured with respect to a Y-position of rotor 18 shown in FIG. 3A, in which a first rotor blade 22a of the three exemplary rotor blades 22a, 22b, 22c is with its blade tip at the lowest possible point and substantially vertically orientated. In this embodiment, the angular orientation α of rotor 18 is measured in terms of the angular orientation as of first rotor blade 22a.

However, which of the rotor blades 22a, 22b, 22c is used as reference is not important.

Further, the angular orientation a of rotor 18 may also be determined differently, for example as angle between yaw axis 38 and a pitch axis of one of the rotor blades, such as pitch axis 34a of first rotor blade 22a, in projection onto the rotor plane defined by rotor axis 30.

Other definitions of the reference angular orientation (α=0°) are also possible, for example a reference orientation of the rotor axis may be used for this purpose.

As illustrated in FIG. 3B, rotor 18 may be operated close to a predefined desired angular orientation $\alpha_{des}$ with respect to the rotor axis 30 when the generator of the wind turbine is not used for converting wind power into electrical power.

This is typically achieved by pitching one or more rotor blades 22a-22c, in the embodiment illustrated in FIG. 3B by pitching first rotor blade 22a round its pitch axis 34a.

For this purpose, the corresponding pitch angle $\beta_a$ may be limited to a predefined pitch angle range.

The predefined desired angular orientation $\alpha_{des}$ is typically chosen such that mechanical loads expected to act on wind turbine components, in particular supporting components of wind turbine 10 are at least on average close to a minimum value, more typically lowest, when the wind-exposed rotor 18 is at the predefined desired angular orientation while the generator is not in a power operating mode.

Typically, rotor 18 is moved around the predefined desired angular orientation $\alpha_{des}$, more typically in an alternating and/or oscillating manner.

Even more typically, the movement of rotor 18 is limited to a predefined angle range around the predefined desired angular orientation lacs in this mode.

Figure 4A:
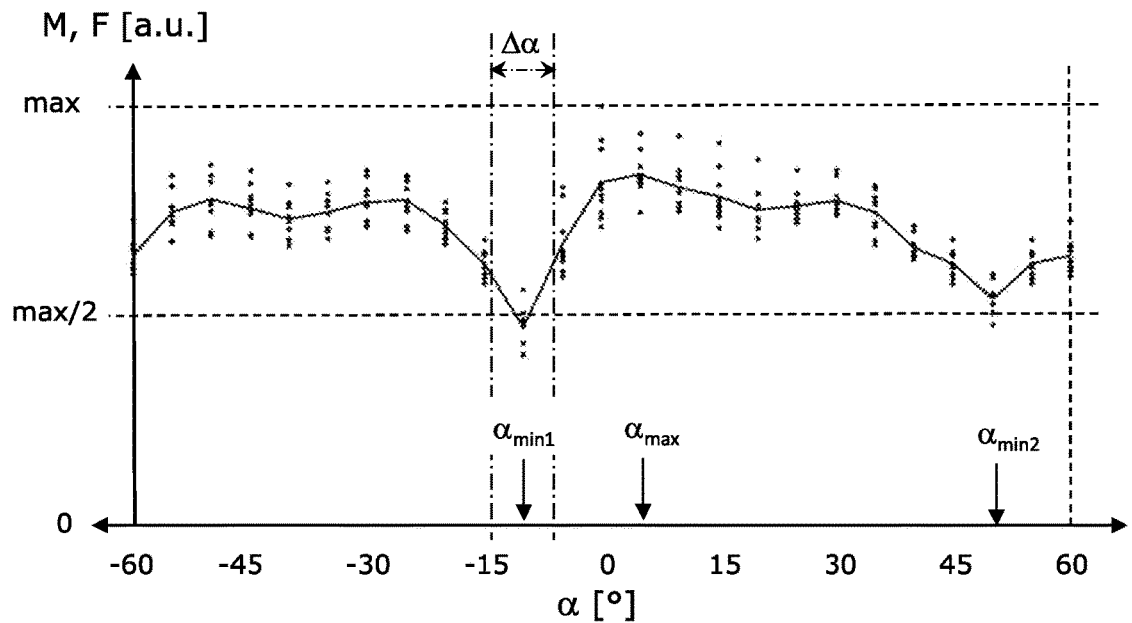
FIG. 4A illustrates loads acting on a wind turbine as shown in FIG. 1 and FIG. 2 according to an embodiment of the present disclosure.

As further illustrated in FIG. 3B and in more detail in FIG. 4A, the predefined desired angular orientation ads may be close but different to the Y-position α=0° of wind turbine 10.

FIG. 4A illustrates mechanical loads M, F in arbitrary units acting on supporting components of an exemplary wind turbine was three rotor blades as shown in FIG. 1 to 3A as function of the angular rotor orientation α around the Y-position α=0°.

Dots corresponds to respective weighted sums of values for the mechanical loads M, F (torques M and forces F) acting on different component under a given wind condition that where obtained using a numerical simulation of a model describing the mechanical properties of the wind turbine. The shown curve corresponds to a least square fit of the dots.

In the exemplary embodiment, the load-curve (M, F as function of a) has, in the relevant range of 120°, several maxima and minima, in particular the global minimum at $\alpha_{min1}$ of about 10° and is a local minimum at $\alpha_{min2}$ of about 50°.

In the exemplary embodiment, lowest mechanical loads are to be expected at rotor position of $\alpha_{min1}+n*120°$ with n being whole number. Accordingly, $\alpha_{min1}$ it is typically chosen as predefined desired angular orientation $\alpha_{des}$.

Further, the shown numerically obtained results are typically used to determine a predefined angle range Δα in which the rotor is to be operated when the generator is not operating in a power generating mode and/or a wind speed in front of and/or acting on the rotor is equal to or larger than a predefined threshold value, in particular a cut-out wind speed of the wind turbine plus some optional margin of e.g. 1% to 25%, more typically 5% to 15%.

However, these values typically depend on the particular design of the wind turbine.

This applies in particular to the determined desired angular orientation $\alpha_{des}$ as well as the determined predefined angle range Δα.

Note that the asymmetry of the shown numerically obtained results is mainly due to the particular airfoils of the three (identical) rotor blades.

As can further be seen from the numerically obtained results in FIG. 4A, the loads M, F can be significantly reduced, when the rotor is operated to move around the determined predefined desired angular orientation $\alpha_{des}$ in an alternating fashion while the generator is not in a power operating mode, and/or when the rotational rotor movements are limited to the determined predefined angle range Δα while the generator is not in a power operating mode.

For example, the loads M, F may be reduced in this mode by up to 25% or even up to 30% compared to operating the rotor in an idling mode (without controlling the rotor orientation).

This is of particular importance for high wind conditions (storm conditions), and also typically depends on the particular design of the wind turbine.

Further, the achievable load savings may also depend on the location of the wind turbine, in particular the (expected) wind profile at the location typically also taken into account for determining the desired angular orientation $\alpha_{des}$ and/or the desired angle range $\Delta\alpha$.

Figure 4B:
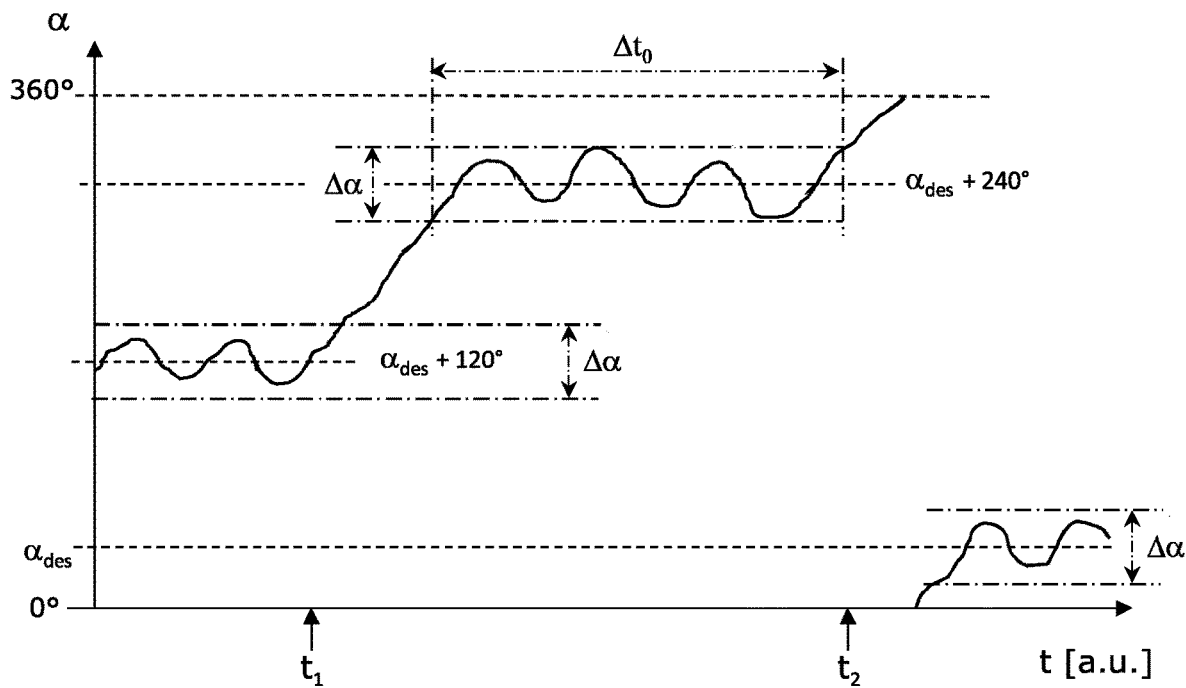
FIG. 4B illustrates operating a rotor of a wind turbine as shown in FIG. 1 and FIG. 2 to move around predefined desired angular orientations with respect to its axis of rotation according to an embodiment of the present disclosure.

FIG. 4B shows a typical rotor orientation $\alpha$ of a rotor of a wind turbine as shown in FIG. 1 to FIG. 3B as function of time t while the generator is not in a power operating mode. The illustrated time interval typically corresponds to about a quarter of an hour.

In the illustrated time interval, the rotor is initially moved within the desired angle range $\Delta\alpha$ around a second one of three equivalent desired angular orientations $\alpha_{des}+(k-1)*120°$ of the rotor in an (non-periodic) alternating/oscillatory manner, wherein the second rotor blade (k=2) is the lowest one of the three rotor blades.

The three equivalent desired angular orientations $\alpha_{des}+(k-1)*120°$ of the rotor may be determined as explained above with regard to FIG. 4A.

When a duration of operating the rotor 18 to move within the desired angle range $\Delta\alpha$ around the second desired angular orientations $\alpha_{des}+120°$ reaches a predefined time interval $\Delta t_0$ of e.g. at least one minute, more typically at least 2 min up to 5, 10 or even 20 min, the rotor is transferred into the desired angle range $\Delta\alpha$ around a third one of the three equivalent desired angular orientations $\alpha_{des}+(3-1)*120°$ and afterwards operated therein in an oscillatory manner, wherein the third rotor blade (k=2) is the lowest one of the three rotor blades.

When a duration of operating the rotor 18 to move within the desired angle range $\Delta\alpha$ around the third desired angular orientations $\alpha_{des}+120°$ reaches the predefined time interval $\Delta t_0$, the rotor is transferred into the desired angle range $\Delta\alpha$ around a first one of the three equivalent desired angular orientations $\alpha_{des}$ and afterwards operated therein in an oscillatory manner, wherein the first rotor blade (1=2) is the lowest one of the three rotor blades.

This may be repeated (also with varying order of rotor blades in lowest position) until e.g. the generator is switchable/switched into the power generating mode.

FIG. 5A is a flow diagram of a method 1000 of operating a wind turbine as explained above with regard to FIG. 1 to FIG. 3B.

In a first block 1100, it is determined, typically by a controller of the wind turbine, that the generator of the wind turbine is not operating in a power generating mode. This may include explicitly setting the generator in a non-power generating mode.

Thereafter, the rotor is operated to move around a predefined desired angular orientation with respect to the rotor axis, typically in an alternating fashion, e.g. similar as explained above with regard to FIG. 4B.

FIG. 5B is a flow diagram of a method 1001 of operating a wind turbine as explained above with regard to FIG. 1 to FIG. 3B. Method 1001 is similar to method 1000 explained above with regard to FIG. 5A. However, prior to operating the rotor to move around the predefined desired angular orientation in block 1200, it is determined that the rotor is idling (and thus the generator not used for power conversion) in a block 1110 of method 1001.

FIG. 5C is a flow diagram of a method 1002 of operating a wind turbine as explained above with regard to FIG. 1 to FIG. 3B. Method 1002 is similar to methods 1000, 1001 explained above with regard to FIG. 5A.

However, it is first checked if certain condition(s) are met in a decision block 1010, 1030 for actually stopping an electric power generation of the generator in a block 1140 and subsequently operating the rotor to move around the predefined desired angular orientation(s) in block 1200.

In decision block 1010, 1030 it may be checked if the wind speed in front of the rotor is equal to or larger than one or more threshold values $v_{threshold}$.

For example, if the wind speed is higher than a cut-out wind speed of the wind turbine, block 1010, 1030 typically determines that the condition(s) is met ("yes").

Further, if a fault is detected challenging or forbidding power conversion of the generator and/or the wind speed is high enough (but lower than the cut-out wind speed), block 1010, 1030 may also determine that the condition(s) is met ("yes").

In other cases, block 1010, 1030 may determine that the condition(s) is not met ("no").

FIG. 5D is a flow diagram of a method 1003 of operating a wind turbine as explained above with regard to FIG. 1 to FIG. 3B. Method 1003 is similar to method 1000 explained above with regard to FIG. 5A.

However, prior to operating the rotor to move around the predefined desired angular orientation(s) in block 1200, the rotor is transferred towards and/or into the predefined desired angular orientation in a block 1150, in particular after determining that the rotor is idling, after detecting a fault condition, after stopping the electric power generation and/or when the speed of a wind is equal to or larger than a predefined threshold value $V_{threshold}$.

FIG. 5E is a flow diagram of a method 1004 of operating a wind turbine as explained above with regard to FIG. 1 to FIG. 3B. Method 1004 is similar to method 1003 explained above with regard to FIG. 5D.

However, prior to transferring the rotor towards the predefined desired angular orientation in block 1125, it is determined that an actual angular orientation of the rotor is not at least close the predefined desired angular orientation, in particular outside a predefined angle range around the predefined desired angular orientation.

Further, it is typically checked if a duration of operating the rotor to move around the predefined desired angular orientation in block 1200 is equal to or larger than a predefined time interval $\Delta t_0$. If so, the rotor is transferred towards a further (equivalent) predefined desired angular orientation with respect to the rotor axis in a block 1250.

Subsequently, the rotor may be operated to move around the further predefined desired angular orientation.

FIG. 5F illustrates a flow diagram of a method 2000 for designing a wind turbine as explained above with regard to FIG. 1 to FIG. 3B.

In a block 2100, for a given configuration of the wind turbine and assuming that the generator of the wind turbine is not in a power generating mode while a wind acts on the rotor, a desired angular orientation of the rotor with respect to its axis of rotation is determined so that a predefined measure for mechanical loads acting on a drive train and/or a supporting structure for the rotor and the drive train is expected to be lower when the rotor is at the desired angular orientation compared to other angular orientation(s) of the rotor with respect to its axis of rotation, in particular at least close to a minimum value.

In a subsequent block 2200, the determined measure for the mechanical loads and/or the mechanical loads are used to calculate desired material properties and/or desired geometric properties of the configuration so that the wind turbine is expected to safely withstand the wind when the rotor is operated at least close to desired angular orientation, in particular within an angle range around a desired angular orientation that may also be determined in block 2100, even if a speed of the wind reaches an expected maximum value and/or is fluctuating.

As indicated by the dashed arrow in FIG. 5F, the blocks 2100 and 2200 may be repeated, for example several times.

Prior to a new cycle (entering block 2100), the configuration of the wind turbine is typically updated in accordance with the calculated material properties and/or desired geometric properties.

Typically, the blocks 2100 and 2200 are repeated until one or more convergence criteria are met and/or the number of cycles reaches a threshold value.

The respective convergence criteria may e.g. refer to the measure for the mechanical loads and/or the desired angular orientation.

FIG. 5G illustrates a schematic view of a wind turbine 11 which is typically similar to wind turbine 10 explained above with regard to FIG. 1 to FIG. 3B and may even represent wind turbine 10.

Wind turbine 11 includes a rotor 18 including a rotor axis 30 and rotor blades, a drive train 64 including a generator 42 mechanically connected with rotor 18, one or more device D for influencing a rotational movement of the rotor about the rotor axis, and a controller 36 connected with the generator 42 and the device D. The controller 36 is configured to set the generator 42 into a non-power generating mode, and to control the one or more devices D such that the rotor 18 moves around a desired angular orientation with respect to the rotor axis 30, in particular in an alternating and/or oscillating fashion.

As indicated by the dashed arrows in FIG. 5G, wind turbine 11 may have a first sensor S1 for measuring a value correlated with a speed of the wind 28 in front of rotor 18, and/or a second sensor S2 for measuring an actual angular orientation α of rotor 18, which are connected with the controller for transfer of data (measurement values).

Further, the controller 36 may be configured to use measured values received from the first sensor S1 to determine that the speed of wind 28 is equal to or larger than a threshold value, and depending thereon to control, using measured values received from the second sensor S2, the one or more devices D such that the rotor 18 moves around the desired angular orientation.

Typically, controller 36 only uses one, several or even all pitch drive systems each coupled to a respective rotor blades as a respective device D for influencing the rotational movement of the rotor via pitching the rotor blade(s), more typically only one pitch drive system at a time.

However, a rotor brake of wind turbine 11 and/or even generator 42 may alternatively or more typically additionally be used for this purpose.

Further, the controller 36 is typically configured to perform any of the processes of the operating/controlling methods as explained herein.

According to an embodiment of a method for operating a wind turbine comprising a generator at high wind speed, in particular in a storm conditions, and/or for designing the wind turbine to be safely operable at the high wind speed, the method includes determining, assuming that the generator is not operating in a power generating mode, a desired angular orientation of the rotor with respect to its axis of rotation so that a mechanical load acting on the rotor and/or other components of the wind turbine, in particular a supporting structure for the generator and/or the rotor such as a nacelle and a tower of the wind turbine, is expected to be lower than in other angular orientation of the rotor with respect to the axis of rotation.

According to an embodiment of a method for operating a wind turbine including a rotor shaft having an axis of rotation, a generator rotor mechanically connected with the rotor shaft, and a rotor mechanically connected with the rotor shaft, rotatable about the axis of rotation, and having rotor blades, the method includes determining that a speed of a wind in front of and/or acting on the rotor is equal to or larger than a predefined threshold value which is typically equal to or larger than a cut-out wind speed of the wind turbine; and operating the rotor at least close to a predefined desired angular orientation with respect to the axis of rotation while the generator is not operating in a power generating mode. At the desired angular orientation, a mechanical load acting on the rotor and/or other components of the wind turbine, in particular a supporting structure for the generator, the rotor and/or the rotor shaft such as a nacelle and a tower, is expected to be lower than in another angular orientation of the rotor with respect to the axis of rotation, typically at least close to a minimum value, when the generator is not operating in a power generating mode.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. For example, while the written description refers to horizontal axis wind turbines, the embodiments may also refer to vertical axis wind turbines, in particular variable pitch vertical axis wind turbines. Accordingly, operating the rotor to move around a predefined desired angular orientation with respect to the axis of rotation of the rotor in an alternating fashion while the generator is not in a power operating mode may both applied to horizontal axis wind turbines and vertical axis wind turbines. Such other examples are intended to be within the scope of the claims if they include elements that do not differ from the literal language of the claims, or if they include equivalent structural elements with insubstantial differences from the literal languages of the claims.

The present invention is not limited to the above-described embodiments and modifications and may be embodied in various forms within the gist thereof, for example, the technical features of the embodiments referring to operating a wind turbine may be combined with the embodiments referring to designing a wind turbine may be combined, i.e. operating a wind turbine as explained herein may refer to operating a wind turbine designed as explained herein. Further, modifications corresponding to the technical features according to the aspects described in the Summary of the Invention section may be replaced or combined as appropriate to solve some or all of the above-described problems or obtain some or all of the above-described effects. The technical features may also be omitted as appropriate unless they are described as being essential in this specification.

REFERENCE NUMBERS

| | |
|---|---|
| 10, 11 | wind turbine |
| 12 | tower |
| 14 | support system |
| 16 | nacelle |
| 18 | rotor |
| 20 | rotatable hub |
| 22-22c | rotor blades |
| 24 | blade root portion |
| 26 | load transfer regions |
| 28 | wind direction |
| 30 | axis of rotation |
| 32 | pitch system |
| 34, 34a | pitch axes |
| 36 | wind turbine controller |
| 38 | yaw axis |
| 40 | processor |
| 42 | electric generator |
| 44 | Main shaft |
| 46 | gearbox |
| 48 | high speed shaft |
| 50 | coupling |
| 52 | Main frame |
| 54 | Decoupling support means |
| 56 | yaw drive mechanism |
| 58 | meteorological mast |
| 60 | forward support bearing |
| 62 | aft support bearing |
| 64 | drive train |
| 66 | pitch assembly |
| 68 | pitch drive system |
| 70 | sensor |
| 72 | pitch bearing |
| 74 | pitch drive motor |
| 76 | pitch drive gearbox |
| 78 | pitch drive pinion |
| 80 | pitch control system |
| 84 | power source/power supply |
| 86 | cavity |
| 88 | inner surface |
| 90 | outer surface |
| α | angular orientation of the rotor |
| S1, S2 | sensor |
| D | device influencing rotor motion |
| >=1000, | method, method steps |

The invention claimed is:

1. A method for operating a wind turbine, the wind turbine having a drive train including a generator, a rotor shaft mechanically connected with the generator and having an axis of rotation, and a rotor having rotor blades mechanically connected with the rotor shaft and rotatable about the axis of rotation, the method comprising:
   determining that the generator is not operating in a power generating mode; and
   operating the rotor to move around a predefined desired angular orientation ($\alpha_{des}$) with respect to the axis of rotation in an alternating fashion.

2. The method according to claim 1, further comprising:
   determining that a speed of wind in front of or acting on the rotor is equal to or larger than a predefined threshold value ($V_{threshold}$) prior to operating the rotor to move around the predefined desired angular orientation ($\alpha_{des}$); and further comprising:
   (a) determining that the generator is not operating in a power generating mode by determining a fault condition;
   (b) determining that the generator is not operating in a power generating mode by stopping electric power generation of the generator;
   (c) determining that the generator is not operating in a power generating mode by determining that the rotor is idling;
   (d) determining an actual angular orientation of the rotor with respect to the axis of rotation;
   (e) transferring the rotor towards the predefined desired angular orientation ($\alpha_{des}$) after performing one or more of (a) through (d).

3. The method according to claim 2, wherein the threshold value ($V_{threshold}$) is equal to or larger than a cut-out wind speed for the wind turbine.

4. The method according to claim 2, wherein the threshold value ($V_{threshold}$) is smaller than a cut-out wind speed for the wind turbine and the rotor is transferred towards the predefined desired angular orientation ($\alpha_{des}$) after the determining of a fault condition.

5. The method according to claim 1, wherein the rotor is operated in a predefined angle range ($\Delta\alpha$) comprising the predefined desired angular orientation ($\alpha_{des}$).

6. The method according to claim 1, wherein the predefined desired angular orientation ($\alpha_{des}$) is chosen to cause one or more of: less than a maximum value of expected loads on wind turbine components; or an angular orientation of the rotor of 0° corresponding to a rotor orientation in which a tip of one of the blades is at least close to a lowest point or is at least substantially vertically orientated.

7. The method according to claim 1, further comprising one or more of:
   determining a duration of operating the rotor to move around the predefined desired angular orientation ($\alpha_{des}$);
   transferring the rotor towards a further predefined desired angular orientation with respect to the axis of rotation; or
   operating the rotor to move around the further predefined desired angular orientation ($\alpha_{des}$).

8. The method of according to claim 7, wherein one or more of transferring the rotor towards the predefined desired angular orientation ($\alpha_{des}$), operating the rotor to move around to the predefined desired angular orientation ($\alpha_{des}$), transferring the rotor towards the further predefined desired angular orientation, or operating the rotor to move around the further predefined desired angular orientation comprises pitching at least one of the rotor blades.

9. The method according to claim 8, wherein not all of the rotor blades are pitched non-simultaneously during pitching the at least one of the rotor blades.

10. A wind turbine, comprising:
    the drive drain set forth in claim 1;
    at least one device (D) for influencing a rotational movement of the rotor about the axis (30) of rotation; and
    a controller connected with the generator and the at least one device (D), the controller configured to operate the wind turbine in accordance with the method of claim 1.

11. The wind turbine according to claim 10, further comprising a first sensor to measure a value correlated with a speed of the wind in front of or acting on the rotor, wherein the controller is connected with the first sensor and configured to use the measured value for determining that the speed of the wind is equal to or larger than a threshold value ($V_{threshold}$), and depending thereon to control the at least one device (D) such that the rotor moves around the desired angular orientation ($\alpha_{des}$).

12. The wind turbine according to claim 11, further comprising one or more of:
    a second sensor to measure an actual angular orientation of the rotor with respect to the axis of rotation;

the device (D) for influencing the rotational movement of the rotor comprising:
- a pitch drive system coupled to the rotor blades and controllable by the controller to act as the device (D) for influencing the rotational movement of the rotor;
- a rotor brake controllable by the controller; and
- a power source configured to provide electric power to one or both of the pitch drive system and the rotor brake during an electrical power loss event of the wind turbine.

13. The wind turbine according the claim 11, wherein the rotor comprises three rotor blades and the controller is configured such that the desired angular orientation ($\alpha_{des}$) is determined to place the rotor is at a Y-position of the rotor blades.

* * * * *